United States Patent Office 3,486,929
Patented Dec. 30, 1969

3,486,929
BONDED AND DYED FIBROUS SUBSTRATES AND PROCESSES
Harry D. Anspon, Kansas City, Mo., and Jack Hurst, Merriam, Kans., assignors, by mesne assignments, to Gulf Oil Corporation, Pittsburgh, Pa., a corporation of Pennsylvania
No Drawing. Continuation-in-part of application Ser. No. 131,108, Aug. 14, 1961. This application Dec. 31, 1962, Ser. No. 248,297
Int. Cl. C08d *13/20*
U.S. Cl. 117—138.8                25 Claims This application is a continuation-in-part of application Ser. No. 131,108, filed Aug. 14, 1961.

This invention relates to bonded fibrous substrates and processes. More particularly, this invention relates to bonded fibrous substrates wherein the bonding agent is an ethylene-acrylic interpolymer and processes for providing said bonded fibrous substrates.

Fibrous structures such as represented in fabrics, cellulosic articles, filters, insulation structures, felts, battings and the like frequently require for adequate performance that individual fibers thereof be bonded one to another. A number of methods have been proposed which have had one degree or another of success. A desired bonding agent has a reasonableness of cost coupled with ease of application to fibers in bonding, and usually it is highly desired to have in the bonded substrates high resistances to cleaning procedures, such as dry cleaning with chlorinated hydrocarbon solvents or laundering with commercial soaps or detergents. Additionally, certain bonded substrates require resistance to attack by chemical agents, e.g., acids, alcohols, alkalis, etc. The formed bonds must also have good tensile strength and resistance to ultraviolet degradation.

Furthermore, it is highly desired in many applications to employ a bonding agent which is capable of also bonding the lower cost pigment dyes to the fibers of the substrates. The bonding agent preferably should not greatly interfere with the texture of "hand" of the material, and the affixed dye particles should resist removal on washing, dry cleaning, and should show resistance to degradation or fading by sunlight. It is desired that the pigment particles show little or no wet or dry crocking (i.e., resistance by the particles to being abraded away on contact of the pigmented substrate with a white cloth or other object). Other desired advantages include high tear strength, good color development, and heat sealability without clinging to the heat sealing bars (if desired in particular applications).

Accordingly, provided by this invention are bonded fibrous substrates wherein fibers of said substrates are bonded one to another with a bonding agent comprising a water-insoluble ethylene-acrylic interpolymer having from about 0.01 to about 0.5 mole of acrylic groups per mole of contained ethylene groups, which interpolymers have the character of being convertible to the physical state of a shelf-stable aqueous emulsion without substantial employment of emulsifying agents, said ethylene-acrylic interpolymers being formable from a thermoplastic ethylene-alkyl acrylic ester interpolymer having from about 0.01 to about 0.5 mole of acrylic groups per mole of contained ethylene groups, said water-insoluble ethylene-acrylic interpolymer having an emulsification-inducing portion of said acrylic groups in a hydrophilic form.

Also provided by this invention are processes of providing such bonded fibrous substrates wherein the substrates are treated with a bonding quantity of the bonding agents described herein, any excess bonding agent is removed, and said treated fibrous substrate is cured or fused as by heating to form fixed bonds.

In general, the fibrous substrates suitable for preparation of the products of this invention can have a broad scope of chemical constituents and physical characteristics such as density, porosity, surface area, strength and the like. The employed fiber can be natural, synthetic, organic, or inorganic. The fibers and the substrates can be non-woven wherein the fibers are laid upon one another in an orderly or completely random manner. Furthermore, the fibers of the substrates can be woven together to form such fibrous substrates as fabrics, carpets, or heavier objects such as manifested in industrial filters, insulations, absorbers, and the like.

The term "fiber" includes staple, yarn, filaments, card sliver, twisted continuous filaments, and the like. The term "fabric" includes materials which are woven, knitted, felted, fused or otherwise constructed from fibers; for example, the term "fabric" includes pile fabrics and paper fabrics.

Examples of natural fibers include cotton, flax (linen), hemp, jute, ramie, sisal, abaca, pharmium, silk, wool, fur, hair of all types (such as goat and horse), animal bristles of all types (such as hog and camel), straw and the like.

Synthetic fibrous materials which may be used as the substrate include those made from polyamides, such as poly(hexamethylene adipamide), poly(hexamethylene sebacamide), polycaproamide, and copolyamides, polyesters and copolyesters such as condensation products of ethylene glycol with terephthalic acid, ethylene glycol with 10/100 mixture of terephthalic/isophthalic acids, ethylene glycol with a 98/2 mixture of terephthalic/5-(sodium sulfo)-isophthalic acids, and trans-p-hexahydroxylene glycol with terephthalic acid, polyacrylonitrile, copolyacrylonitriles (with vinyl acetate, vinyl chloride, methyl acrylate, vinyl pyridine, sodium styrene sulfonate), terpolymers of acrylonitrile/methylacrylate/sodium styrene sulfonate made in accordance with U.S. Patent 2,837,501, vinyl and vinylidene polymers and copolymers, polycarbonates, polyurethanes such as those sold as Spandex, polyesteramides, polyethylenes, polypropylenes, fluorinated ethylene polymers and copolymers (e.g., polytetrafluoromethylene), cellulose derivatives, such as cellulose acetate, cellulose triacetate, composite filaments such as for example, a sheath of polyamide around a core of polyester, and self-crimped composite filaments, such as two acrylonitrile polymers differing in ionizable group content spun as a sheath and core, regenerated cellulose, glass, and the like. Blends of two or more synthetic or natural fibers may be used as well as blends of synthetic and natural. The fibers and filaments may be crimped or uncrimped, drawn or undrawn, and/or bulked or unbulked. Two or more synthetic fibers with or without natural fibers may be blended. Other synthetic fibers include, for example, "Dacron" (a Du Pont trademark) polyester fiber, "Orlon" (a Du Pont trademark) acrylic fiber, "Zefran" (a Dow trademark) acrylic fiber; "Acrilan" (a Chemstrand trademark) acrylic fiber; "Dynel" (a Union Carbide trademark) acrylic fiber; linear polyamides including nylons, "Teflon" (a Du Pont trademark) polytetrafluoroethylene, "Terylene" (a trademark of Imperial Chemical Industries) polyethylene terephthalate polymer, homopolymers, regular copolymers as well as graft copolymers, segmented elastomers, etc. The term also includes materials produced from derivative and regenerated forms of natural polymers such as rayons and proteinaceous fibers such as "Ardil," "Vicara" and the like made from casein, peanut protein and so forth. Glass fibers as well as abestos, rock wool, and silica fibers are fibrous substrates for the processes and products of this invention.

Suitable bonding agent for use in this invention are described in copending application U.S. Ser. No. 131,108, filed Aug. 14, 1961, of which this application is a continuation-in-part application, wherein it is stated that the herein described emulsions or sols have shown highly interesting potential utility in the treatment of fabrics and that they have shown a high ability to bond pigments to the fabric, good retention on water washing and on dry cleaning the treated substrates, and other desired properties.

The water-insoluble ethylene-acrylic interpolymers can be readily formed from an appropriate preformed interpolymer having groups corresponding to ethylene and an alkyl acrylic ester such as methyl acrylate by treatment with an appropriate amount of caustic such as the theoretical amount so as to bring about hydrolysis of any desired portion or all of the ester groups to carboxylate groups. Ethylene-alkyl acrylic ester interpolymers suitable for such conversion to aqueous emulsion form can have a wide range of molecular weights as indicated by their respective inherent viscosity values in p-xylene (deciliters/g.) at 100° C. Suitable interpolymers employable can be selected from those having inherent viscosities from 0.001 deciliter/g. or less up to or exceeding 10 deciliters/g. Often, a combination or range of molecular weight interpolymers can be used to promote modification of "hand," heat sealing qualities, solvent solubility, and the like of the end bonding interpolymeric agent.

Furthermore, other presently preferred water-insoluble interpolymers provided hereby can be formed by adding to the hydrolyzing caustic (e.g., sodium hydroxide or potassium hydroxide) mixture an amount of ammonia (or other suitable amine). When a portion of ammonia (or other suitable amine) is utilized in the chemical conversion of part of the alkyl acrylic ester groups, a substantial portion of unchanged alkyl acrylic ester groups can be present in the final water-insoluble interpolymers, which are capable of forming shelf-stable aqueous emulsions. Generally speaking, the final interpolymer as provided hereby having from 0.01 to about 0.5 mole of acrylate groups per mole of contained ethylene groups can have, depending upon the various influencing factors (such as total acrylic content, molecular weight, and the like, a distribution of the acrylic forms within the following ranges when ammonia (or another suitable amine) and a caustic (e.g., sodium hydroxide or potassium hydroxide) are both used to convert all or a portion of the alkyl acrylic ester groups of an ethylene-alkyl acrylic ester interpolymer: from zero to about ninety percent in alkyl acrylic ester form, from about one to about ninety percent of the acrylic groups being present in amide form (desirably from about five to about seventy), and from about ten to about ninety-nine percent of the acrylic groups being present in carboxylate salt form (desirably from about twenty to about eighty percent), on a mole basis. Carboxylate salts shall include those of weak or strong nitrogenous bases, e.g., dimethyl amine, morpholine, choline, ammonia, and the like.

The above interpolymers can be provided for use in a number of different utilizable physical forms. Such forms include spray dried powders, dry solid forms, wetted forms, paste-like forms, aqueous emulsion forms ready for final end-use application, coagulums of aqueous emulsions, and others.

A preferred form of the interpolymer is the aqueous emulsion form which is a shelf-stable aqueous polymeric emulsion in which the polymer of the emulsion is a water-insoluble, ethylene-acrylic interpolymer having from about 0.01 to about 0.5 mole of acrylic groups per mole of contained ethylene groups, said interpolymer emulsion being formable without substantial employment of emulsifying agents from a thermoplastic ethylene-alkyl acrylic ester interpolymer having from about 0.01 to about 0.5 mole of acrylic groups per mole of contained ethylene groups, said water-insoluble ethylene-acrylic interpolymer having an emulsifying-inducing portion of said alkyl ester groups in a hydrophilic form. Of course, the shelf-stable aqueous polymeric emulsions are included wherein the polymers of the emulsion are species of the interpolymers described hereinabove, as well as other interpolymer species embraced by the above general description.

The water-insoluble interpolymers employed can have the previously referred to range of from about 0.01 to about 0.5 mole of acrylic groups per mole of contained ethylene groups. However, usually the interpolymers desirable have from about 0.025 to about 0.25 mole of arcylic groups and generally speaking have preferably from about 0.05 to 0.15 mole part of acrylic groups per mole of groups of contained ethylene.

The interpolymers can be and preferably are readily provided by starting with an ethylene-alkyl acrylic interpolymer, preferably starting with an ethylene-alkyl acrylic ester interpolymer being of a highly uniform character inasmuch as the alkyl acrylate groups are evenly distributed throughout the polymeric chains shown as by following generally conventional molecular degradation procedures (such as by pyrolytic degradation combined with gas chromatographic analysis of the pyrolysates). Highly suitable acrylic interpolymers for use in this invention are the ethylene-alkyl acrylic copolymers in which the alkyl ester can be an alkyl ester of unsubstituted acrylic acid or a simple alpha-substituted acrylic acid, such as a hydrocarbon substituted acrylic acid which can be illustratively speaking a lower alkyl substituted acrylic acid such as methacrylic acid. Such interpolymers are described by George E. Ham, Harry D. Anspon, and William H. Byler in copending application Ser. No. 50,882, filed Aug. 22, 1960, now Ser. No. 165,451 filed Jan. 10, 1962. In the presently preferred starting interpolymers, the ethylene-lower alkyl acrylic interpolymers are prefered, especially those of the lower alkyl acrylic esters of unsubstituted acrylic acid such as methyl acrylate.

The interpolymer description herein set forth is specifically directed to ethylene-acrylic interpolymers. However, it is to be understood that the main chain of these interpolymers is a polyethylene chain. Moreover, the interpolymers can be viewed generally speaking as a polyethylene with a portion of the orginal acrylic comonomer molecule existing pendant to the main polyethylene chain as side chains or side groups. Thus, in reference to ethylene-methyl acrylic ester interpolymers, as an illustration, the side chains have the structure

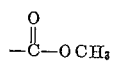

Then, in the description of this invention, ethylene-acrylic interpolymers means those interpolymers having such a main chain with side chains as described herein or their equivalents, from which aqueous emulsions coming within the scope and spirit of this invention can be derived.

It will be suggested to those skilled in the emulsion art with the benefit of the hereinabove disclosure that other chemical alterations can be made in a thermoplastic ethylene-alkyl acrylic interpolymer which will provide other hydrophilic forms resulting in utilizable emulsions. The suggested alternate forms of the acrylate groups derivable from starting ethylene-alkyl acrylic ester interpolymers are generally described by the following equation:

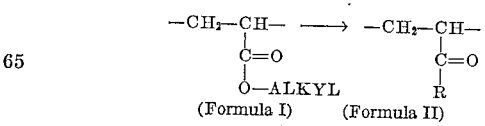

wherein the Formula I is the alkyl acrylic group of the polymer and Formula II represents alternative hydrophilic acrylic forms. The following is in illustration of reactions to provide the alternative forms: A starting thermoplastic ethylene-alkyl acrylic ester interpolymer is reacted with (a) an amino aliphatic carboxylic acid such as glycine to provide for example the sodium acrylic salt form

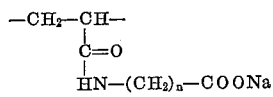

in which $n$ is a small integer; (b) an aminosulfonic acid such as p-aminobenzene sulfonic acid to provide hydrophilic groups illustrated as

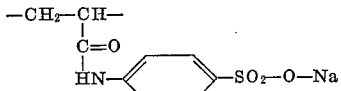

(c) an unsaturated aliphatic amine or alcohol such as allyl amine or allyl alcohol to provide an interpolymer having allyl-substituted acrylic groups which in turn can be altered as by an addition reaction to provide acrylic forms illustrated by the sulfate forms

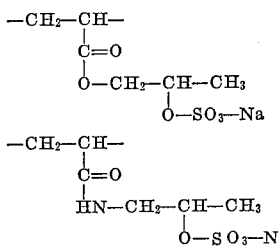

(d) an alkyl diamine such as ethylene diamine to provide an interpolymer having aminoalkyl-substituted amide acrylic forms illustrated by

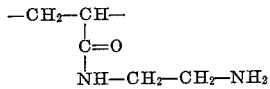

(e) a suitable polyether formed as by ethylene oxide condensation which has hydroxyl groups available for an ester exchange reaction to form acrylic forms illustrated by

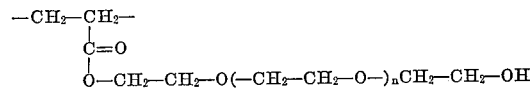

wherein $n$ is an integer of suitable size such as provided by presently marketed nonionic emulsifier products [this acrylic form can be treated to provide another type hydrophilic form illustrated by

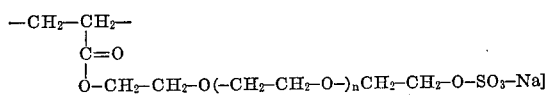

Although the processes and emulsions of this invention are described with particular reference to the employment of ammonia as the amine and alkali metal hydroxides as the base in order to bring about the desired emulsions, it is to be understood that other amines can be used in part or completely to replace ammonia if their use will result in stable emulsions. Moreover, tertiary amines such as choline can be used to provide quaternary amine salt forms.

As discussed above, certain other agents capable of converting the acrylic ester groups to provide an emulsification-inducing amount of a hydrophilic acrylic form can be substituted for the metallic hydroxide agents in providing the necessary groups.

The emulsions of the bonding agents in general exhibit a high degree of stability and have a unique combination of desired properties. The following are some of the characteristics of the emulsions: The preferred emulsions provided by this invention are shelf-stable inasmuch as they give no appearance of significant change after forty-eight hours standing and customarily even after thirty days storage in conventional glass containers at ambient room temperatures. This stability is customarily exhibited without employment of added emulsifying agents. However, suitable conventional emulsifying agents can be added if desired without disrupting the emulsion state of the compositions. The emulsifying agents have been found particularly useful when admixing the emulsions provided by this invention with polymeric emulsions requiring emulsifying agents for stability. The emulsions customarily show unusual stability to temperature extremes, viz., they show freeze-thaw stability and stability to relatively high temperatures such as ordinary boiling water temperatures and higher.

The interpolymer of the emulsions can be coagulated readily as a general rule by addition of an electrolyte such as calcium chloride or by the addition of strong mineral acids. These coagulums can be used in this invention as the bonding agent.

The particles of polymer of the preferred emulsions usually are of surprisingly low particle size, generally of a low micron range. In the preferred emulsions, the great majority of the particles fall in the diameter range of 0.1 or below to about one micron. The particle size can be readily determined by filtration through filters conventional for emulsions particle size determination, by following light scattering techniques, or by electron microscopy.

Various water-miscible solvents can be added to the emulsions without destruction of the emulsions. For example, it has been found that lower alkanols miscible with water can be added to the end emulsions, for example, such lower alkanols as methanol, ethanol, and isopropanol. It has been found that the solvents, for example, the lower alkanols above named, can be added in relatively high quantity of solvent often causes a thickening or increase of viscosity of the emulsions whcih may or may not be a desired characteristic depending upon the intended bonding use. Solvent compatibility is a highly desired characteristic since it permits the coating of hydrophobic fibers.

A further, more specific aspect of this invention concerns a fibrous substrate wherein the bonding agent as above defined serves additionally to affix a pigment dye to the fibers of said fibrous substrate. This aspect of the invention additionally concerns the novel processes of dyeing the fibrous substrate by the use of said bonding agent and the hereby provided novel dyeing compositions comprising the bonding agent in combination with a pigment dye.

It is highly desired to use pigments in the dyeing of fibrous substrates such as fabrics rather than employing dye-stuffs. In contrast to dye-stuffs, pigment dyes are ordinarily substances whcich are insoluble in water and, generally, in most organic solvents. Substrates which are dyed by the use of such pigments are customarily more light-fast and, importantly, the pigment dyeing procedure is customarily more economical, highly versatile, and can be conducted more rapidly. In dyeing using such pigment dyes, it is necessary that the pigment be fixed to the fibers themselves by using a bonding agent. This is necessary in view of the fact that the chemical reaction of the dyeing substance with the fibers such as ordinarily occurs in use of dye-stuffs is lacking.

The dyeing can be accomplished employing aqueous emulsions of the polymeric substances which act as bonding agents wherein the aqueous emulsion contains a suitable quantity of the finely divided pigment dye. The compositions may contain thickening agents, protective colloidal agents, catalysts, stabilizers, and in some instances thermosetting resins, as desired.

Additionally, the dyeing substance or formulation can be in the form of a printing paste wherein the pigment agent and the polymeric bonding agent are intimately mixed in a water-in-oil emulsion form of a paste-like consistency. These printing pastes are applied to fabrics conventionally by means of rollers so that certain portions of the fabric are decorated or printed with the pigment-bonding agent combination. The success of such pigment dyeing techniques is, as is readily seen, largely dependent upon the nature of the bonding agent and its ability to bond.

As can readily be appreciated, a drawback of many fibrous substrates which are dyed by use of pigment colors or dyes is their crocking. Crocking as previously indicated is a characteristic of the color of the fabric to mark off by abrasion onto an unprinted or undyed portion of the same fabric or onto other fabrics or materials with which it comes in contact. This crocking process is ordinarily spoken of with relation to specific crocking, i.e., dry crocking which is susceptability to marking an unprinted fabric on abrasion when dry whereas wet crocking is similarly its susceptability to marking an unprinted fabric when the fabric is wet.

Other stringent tests of the ability of a bonding agent to fix pigments on a permanent basis to the fabric are laundering and dry-cleaning tests. These are important considerations since a great deal of abrasive and other stresses are applied during these tests which evaluate the ability of the bonding agent to affix permanently the dye particles to the fibrous substrates. Therefore, if the substrate sustains these tests, it is taken as good indication that the bonding agent is highly effective.

In pigment dyeing, generally an amount of a commercially provided dye composition equivalent to the bonding agent in an aqueous emulsion, is a satisfactory amount, on a weight basis. Ordinarily, about 25 percent to about 300 percent of the pigment composition solid weight (preferably about 50 to about 150 percent) will be employed, based on the solids weight of the bonding agent.

In forming a bonding agent-pigment paste, suitable thickeners for pigment printing, commonly known as thickening agents can be employed. Common thickening agents such as gum, gum tragacanth, alginates, certain cellulosic materials such as methyl cellulose and hydroxyethyl cellulose, aqueous gasoline, and aqueous oil emulsions can be employed. In general, the printing paste can be formulated by intimately mixing the emulsions containing the polymeric bonding agent with the solution of the thickener and then adding the pigment dye to the resulting thickened bonding agent paste. The paste can be diluted with water if desired. Colloidal agents, thermosetting resins, catalyst, and the like can be added in accordance with conventional practice if desired or needed to provide a satisfactory pigment paste. Ordinarily a printing paste is comprised of a bonding agent, a thickening agent, and a pigment dye, the composition being of a consistency of a paste suitable to perform a printing function.

Suitable thermosetting resins which can be included in the bonding compositions, if desired, include amino-aldehyde resins, such as urea-aldehyde or melamine-aldehyde resins, which are alkylated and are organic solvent-soluble—herein called "organic solvent - soluble amino-aldehyde resins." Other suitable thermosetting resins can be used if desired. The interpolymers can also be crosslinked by employing other agents, such as aldehydes, if appropriate acrylic forms are present on the bonding agent interpolymer chains. Illustrative suitable aldehydes include both aliphatic and aromatic aldehydes such as formaldehyde, acetaldehyde, isobutyraldehyde, n-caproaldehyde, n-heptaldehyde, chloral, glyoxal, benzaldehyde, and the like. If —$NH_2$ amide groups and alkali metal carboxylate groups, e.g., are present in the interpolymer, it is believed crosslinking, if desired, can be accomplished without the use of an added crosslinking agent, rather by only the use of an appropriate "acid catalyst." At times, crosslinking can beneficially affect the properties of the end bonded substrate, e.g., as to improved "hand" and the like.

Certain catalysts which are compatible with the compositions can be used although generally there is no advantage in employing a catalyst in conjunction with the bonding agents employed in this invention. However, it has been found that certain amine catalysts, such as ammonium chloride, ammonium hydroxide, commercial catalysts compositions such as sold under the trademark "Permafresh N," and the like, can be used in view of their compatibility with the system. Other catalyst systems will be suggested to those skilled in the arts in view of the herein set out disclosure.

A striking advantage of the herein provided processes and bonding agent compositions consist of the fact that in our preferred procedures there is no requirement to employ a catalyst nor a thermosetting resin. This cuts down on a number of steps involved in providing a well-bonded fibrous substrate (such as a fabric) which is ready for commercial use. This property, of course, enables less expenditures of time and materials in producing well-bonded substrates.

A wide range of pigment agents are suitable for use in this invention. It has been found that most if not all of the commercially available pigment dyes can be employed. Of course, it will be realized that the particular formulation can be influenced by the exact selection of the pigment dye, the substrate employed the particular bonding agent employed, whether a catalyst or thermosetting resins are present, and other influencing factors.

The following dyes are illustrative of the pigments which can be employed in this invention: The pigments can be organic or inorganic. The pigment can be carbon black, such as made by precipitation methods. The pigments are in general very fine powders which are essentially water insoluble. Suitable pigments include phthalocyanine pigments such as phthalocyanine blue (Monastral Fast Blue and Heliogen Blue) and phthalocyanine green (Monastral Fast Green and Heliogen Green); azo pigments such as benzidine yellows, benzidine oranges, Hensa Yellows, insoluble azo reds such as Fast Red Color Salt ITR, Napthol AS type coupling pigment products, Aniline Black, and Monastral Fast Gold Green, and other insoluble azo pigments; various vat pigments can also be employed as defined in U.S. 2,907,720, which are of the indigoid and anthraquinone types. Various carbon blacks including furnace blacks, channel blacks, lamp blacks, and insoluble inorganic compounds such as chromium oxide, titanium oxide, etc., can be used as the pigment dye. It is to be understood that functional combinations of the various pigment agents, bonding agents, etc., within the scope hereof, can be made and are included within the spirit of this invention.

The suitable pigments are commercially supplied in dispersed form containing from 4 to about 60 percent of the pigment. Commercial products ordinarily will include a dispersing agent, and certain other agents such as colloidal agents, polymer components and the like.

In the above description of the bonding agents the polymer consisting of the bonding agent can be applied to the substrate as an aqueous emulsion, can be applied by spraying or sprinkling a dried, powdered acid or other coagulum form of the interpolymer, as present in the aqueous emulsion, or the like. Also, the bonding agent can be applied to the fibrous substrate dissolved or dispersed in a suitable organic solvent.

As hereinbefore mentioned, ordinarily an AATCC test (American Association of Textile Chemists and Colorists) is available for evaluating the bonding properties of the herein provided bonding agents.

The following tests and criteria are used to evaluate the bonded fibrous substrates:

(1) In referring to the percentage of bonding agent, the following equation is employed:

percent bonding agent =
$$\frac{\text{wt. cured bonded web} - \text{wt. unbonded web}}{\text{wt. unbonded web}} \times 100$$

Then the percentage of the cured bonded web representing the fiber is simply determined by the equation:

Percent fiber of bonded web = 100 — percent bonding agent (2) Elemendorf Tear Strength, Fed. Spec. CCC–T–19 lb., Method 5132, machine direction.
(3) MCRA, Fed. Spec. CCC–T–19 lb., Method 5212, machine direction.
(4) Colorfastness to Dry Cleaning, AATCC Method 85–1960 (perclene).
(5) Colorfastness to Washing, AATCC Method 36–1957–III (160° F./soap/$Na_2CO_3$).
(6) Colorfastness to Crocking, AATCC Method 8–1957 (wet and dry rubbing).
(7) Visual Color Comparison.
(8) Fabric Stiffness, Fed. Spec. CCC–T–19 lb., Method 5206, machine direction.
(9) Dry Clean Fastness, Launder-Ometer, 1 hour, Perclene, 20 steel balls in steel tubes 6" x 2", test sample attached at both ends to 80 x 80 white cotton woven fabric.
(10) Wash Fastness, Launder-Ometer, #3AATCC Wash Test (¾ hour, 160° F., 100 ml. 0.5% soap/0.2% $Na_2CO_3$) 6" x 2" test sample attached at both ends to 80 x 80 white cotton woven fabric. Conventionally, a milder test is used in evaluation of glass fiber substrates.

The following procedure is a preferred illustrative procedure for carrying out the bonding process of this invention: A fabric web having a weight of 2 ounces per square yard and consisting of a nylon-acetate web supplied by Pellon Corporation of Lowell, Mass., is saturated with an aqueous polymeric emulsion of an ethylene-acrylic interpolymer described above. The placement of the web into the aqueous bath is conveniently conducted on a laboratory scale by placing the fabric to be bonded between sheets of vinyl coated fiberglass screening prior to immersion. The emulsion employed suitably has a concentration of 5 to 10 percent by weight of the interpolymer. If a pigment is employed in the bonding composition, it has been found that 5 percent concentration of solids of many commercial pigment compositions is suitable.

The fabric is removed from the aqueous bath and the excess interpolymer aqueous emulsion is removed from the fabric web by passing the screen fabric combination through rubber rollers having sufficient spring pressure to remove excess aqueous emulsion. The treated web is dried by placing it into a circulating, electric heated oven for 10 minutes at 250° F. The dried treated fibrous web is calendered. The calendered web is cured in the circulating, heated oven for 5 minutes at 300° F.

The following examples are in illustration of the products and processes of this invention, but are to be understood not to be in limitation thereof.

Example 1

A quantity of 150 g. of uniform ethylene-methyl acrylate interpolymer (this as well as other "uniform" starting interpolymers employed in the examples are provided by the procedures described by Anspon et al., mentioned above) containing 24.8 percent by weight of methyl acrylate groups as determined by infrared analysis, 6 g. of sodium hydroxide pellets, and 1.8 liters of concentrated ammonium hydroxide (ca. 28 percent by weight of ammonia) are added to a one-gallon Magne-Dash autoclave reactor. The starting interpolymer has a melt index of 1.72 and a density at 25° C. of 0.9365 g./cc. The mixture is heated to about 200° C. for sixteen hours, during which time the reaction mixture undergoes vigorous agitation. On cooling, the reaction product is removed and is filtered through a wool felt filter of 1/16 in. thickness. The filtered bonding agent product is a white emulsion having a polymer solids content of about 9.3 percent by weight.

A sample of the cast film on nitrogen analysis shows 50.2 percent of the original ester groups are converted to amide groups and essentially all of the remainder of the groups are converted to sodium carboxylate groups. The infrared analysis shows virtual absence of alkyl ester groups.

Water is stripped off the emulsion to provide a greater interpolymer concentration (20 percent or greater by weight of polymer). The particle size of the concentrated emulsion polymer particles on electron microscopic inspection reveals again an average particle size diameter less than 0.1 micron with a great number of the particles being of a much lesser size than the 0.1 micron range.

Aqueous emulsions or sols of the bonding agents can be generally provided directly by the above procedure which have higher weight percentages of interpolymers.

Example 2

A fibrous substrate is treated following the procedure hereinabove described as "a preferred illustrative procedure." The fibrous substrates used are nylon-acetate webs (80" x 80") having a weight of 2 ounces per square yard (supplied by Pellon Corporation of Lowell, Mass.). An ethylene-acrylic interpolymer aqueous emulsion is employed as the bonding agent. The emulsion is prepared in general by the procedure of Example 1 from an ethylene-methyl acrylate interpolymer having 15 percent by weight of methyl acrylate groups. About 50% of the acrylic ester groups are converted to sodium carboxylate groups and 50% of the acrylic ester groups are converted to the amide form. The emulsion contains about 22% solids by weight, has a viscosity at 250° C. of about 14.6 centipoises, and has a pH of about 11.

The fibrous web-substrates specimens are treated to give the following webs:

| Treated web | Percent bonding agent | Percent fiber |
|---|---|---|
| 1 | 7 | 93 |
| 2 | 10 | 90 |
| 3 | 25 | 75 |
| 4 | 34 | 66 |

The treated webs exhibit excellent bonding properties as determined by the tactile test. Fabric softness and drapeability are somewhat highest at the lower binding agent percentages.

Example 3

Nylon-acetate webs as employed in Example 2 are used. The bonding agent and procedure employed are those used in Example 2. The following general observations are made on the bonded substrates.

*Tear strength.*—Reduced bonding solids in all cases reduced tear strength. At all levels with or without catalysts, the bonding agent provides excellent bonding.

*Laundering resistance.*—The excellent launder-ability of the bonded webs is maintained even at lower bonding agent levels and without use of catalysts.

*Dry cleaning resistance.*—Bonded fabrics show excellent performance at all the percentages.

*MCRA.*—The crease recoveries of the bonded fabrics are excellent. Specific results of the experiments are shown in the following table:

TABLE I

| Web Treatment | | | | | |
|---|---|---|---|---|---|
| Bonding Agent: Fiber (parts by wt.) | Additives | Fastness | | MCRA Deg. | Tear Str.[3] |
| | | Laundering | Dry Cleaning | | |
| 13:87 | | Excellent | Excellent | 154 | 880 |
| 28:72 | | do | do | 140 | 1260 |
| 13:87 | 1% Cat. AC [1] | do | do | 156 | 1070 |
| 13:87 | Finish G [2] | do | do | 149 | 960 |

[1] "Cat. AC" means the Catalyst AC catalyst product sold by Monsanto Chemical Company. The product is a 35.5% by weight aqueous solution of the catalyst 2-amino-2-methyl-propanol-1-hydrochloride. Catalysis conducted "on bath."
[2] "Finish G" means "Bradsyn Finish Co." (nonionic emulsion of expoxidized soybean oil having 20% by weight of solids—sold by Bradford Soap Works, Inc.).
[3] Elmendorf Tear Strength Values.

Example 4

To show the outstanding ability of the bonding agents employed in this invention to bond non-woven fibrous substrates, a portion of surgical gauze (marketed under the trademark "Red Cross Cotton"—medium gauge, by Johnson and Johnson Company) is treated with an aqueous emulsion of an ethylene-acrylic copolymer having the following description: an ethylenemethyl acrylate interpolymer having 15% by weight of methyl acrylate groups as treated by the process of Example 1 to provide an aqueous emulsion of a bonding interpolymer having 50% of the acrylic groups in sodium acrylic form, and 50% of the groups in amide form. The cotton gauze is essentially saturated with the aqueous emulsion and the excess emulsion was removed by passing the treated gauze through rubber rollers under spring pressure. The treated gauze was cured in an oven at 3 minutes at a temperature of 110° C.

Portions of the non-woven substrate are also bonded using the above ethylene-acrylic interpolymer wherein all of the acrylic groups are in sodium acrylate form. The treated gauze is processed to obtain a cured bonded fibrous substrate in the manner as described above.

Portions of the cotton substrate are also bonded using the above ethylene-acrylic interpolymer wherein all of the acrylic groups are in carboxylic free acid form, which is sprayed on the substrate portions in a dry, finely-divided powder form. The treated portions are then treated or cured as described above.

The above bonded fibrous substrates of cotton gauze have a completely random fiber relationship. The bonded samples are subjected to laundering conditions as follows: The treated samples are introduced into an earthenware vessel containing warm water along with a laundering portion of lauryl sulfate detergent (commercially available under the trademark Tide) and a number of steel balls having a diameter of about one-half inch. A watertight lid is placed on the washing vessel and the loaded vessel is positioned on its side on a rotator and rotated about its axis. The treated substrates remain intact after about 15 minutes of laundering.

Example 5

Employing the procedure described above in Example 2 employing a treating bath containing 5% bonding agent (on the basis of interpolymer solids) and 5% by weight of pigment composition solids, the following experiments are conducted showing that a variety of pigment dyes are effectively bonded to a wide scope of fibrous substrates. The drying temperature employed is about 250° F.

The bonding agent is an aqueous emulsion made generally by the process of Example 1 from an ethylene-methyl acrylate copolymer containing 15 weight percent methyl acrylate groups uniformly distributed within the interpolymer chains. The interpolymer of the emulsion has about 50% of the ester groups converted to acrylic groups in amide form and the other 50% converted to acrylic groups in sodium carboxylate form.

Phthalocyanine Blue W-4021 dye (32-34% total solids; sold by Harshaw Chemical Company) and a fibrous substrate of spun nylon are employed. The experiment is carried out using Permafresh N (a modified urea formaldehyde based thermosetting resin) and 2-amino-2-methyl propanol hydrochloride catalyst as additives. A blank without these additives gives comparable results. The following results are obtained: No. 3 AATC wash test—very slight change in dye value; AATC dry cleaning test—no change in color value; color value—excellent; dry crock value—good; and wet crock value—fair.

Similar results are obtained using Microfix Red R dye and Indanthrene Brilliant Green BN dye. The green dye gave superior crock resistance.

Indanthrene Brilliant Green BN dye and a fibrous substrate of Filament Dacron are employed. The experiment is carried out using Permafresh N (a modified urea formaldehyde thermosetting resin) and 2-amino-2-methyl propanol-1-hydrochloride catalyst as additives. A blank without additives gives comparable results. The following results are obtained: No. 3 AATCC wash test—excellent; AATCC dry cleaning test—excellent; color value—excellent; dry crock—excellent; and wet crock—very good.

Similar results are obtained using Phthalocyanine Blue W-4021 dye (32-34% total solids; sold by Harshaw Chemical Company) and Microfix Red R dye. Using the latter two pigments, crock resistances are slightly reduced.

Indanthrene Brilliant Green BN dye and a fibrous substrate of polypropylene are employed. The following results are obtained: No. 3 AATCC wash test—very good, only very slight change in color value; AATCC dry cleaning test—excellent; color value—excellent dry crock—good; and wet crock—fair. Similar results are obtained using Phthalocyanine Blue dye and Microfix Red R dye. The polypropylene experiments are repeated employing the thermosetting resin product Permafresh N and the catalyst 2-amino-2-methyl propanol-1-hydrochloride.

Indanthrene Brilliant Green dye and a fibrous substrate of woven fiber glass are employed. The following results are obtained: No. 3 AATCC wash test—some loss of dye; AATCC dry cleaning test—excellent (no change in color value); color value—excellent; dry crock—excellent (no noticeable removal of color); and wet crock—relatively low. The fabric did not disintegrate during the dry cleaning test. Cloth treated with similar resins disintegrated showing that the herein employed bonding agent provides considerable bonding of the glass fibers. The tests (standard tests for cotton) are ordinarily considered far too severe for glass. Glass fiber webs are also pigmented using Phthalocyanine Blue pigment.

Indanthrene Brilliant Green BN dye and a fibrous substrate of cotton are used. The following results are obtained: No. 3 AATCC wash test—excellent; AATCC dry cleaning test—excellent; color value—excellent; dry crock—good; and wet crock—good. The experiment is repeated employing the hereinabove named catalyst and thermosetting resin and other pigment dyes. Crock resistances rate essentially the same or higher for all of the pigment dyes.

Aquaprint Green B dye and a fibrous substrate of cotton are used. The following results are obtained: No.

3 AATCC wash test—excellent; AATCC dry cleaning test—excellent; Perclene dry cleaning test in Tumbler Jar 45 minutes at room temperature—excellent; color value—excellent; dry crock—good; and wet crock—fairly good. Prints have superior smoothness giving excellent appearance. Aquaprint Red B dye and Aquaprint Blue 29 dye also are used giving comparable results.

Example 6

The following are added together (parts given are by weight): 25 parts of 2% Natrosol type 250 HV (a commercial hydroxyethyl cellulose product); and 74.5 parts Amsco 46 (a commercial mineral spirits product). The mixture is blended with high speed stirrer to give a stock emulsion. The stock emulsion is used to provide printing pastes by using the following components and forming a uniform blend with a high speed stirrer: 88.75 parts stock emulsion; 11.27 parts of bonding agent (Ex. 1); 10.0 parts of Phthalocyanine Blue Pigment dye product.

The other pigment dyes mentioned in the Examples are also used in following the above procedure to provide printing pastes thereof.

Example 7

A sol or emulsion is prepared from an ethylene-methyl acrylate copolymer (containing 20% by weight of methyl acrylate) by the process of Example 1 so that half the ester groups are converted to sodium carboxylate groups and the remainder are converted to amide groups —$CONH_2$.

The sol is coagulated by the addition thereto of hydrochloric acid. The coagulum interpolymer is washed carefully to remove residual hydrochloric acid and is dried.

A volume of 700 mls. of distilled water placed in a manton Gaulin Laboratory Homogenizer Model 15M–8BA and the machine is started to cycle the water. One hundred grams of the acid coagulated interpolymer are wetted with 38 grams of 50% (w./w.) choline in methanol and are added gradually to the water. The pressure drop across the valve is set at 4000 p.s.i. A stable emulsion is formed having choline carboxylate groups.

200 grams ethylene methyl acrylate copolymer (20% by weight of methyl acrylate groups), 600 ml. water, 600 ml. of concentrated ammonium hydroxide, and 200 grams of 50% (w./w.) choline in methanol are heated in a one-gallon Magne Dash reactor. The temperature is held at 180° C. for 3 hours and then at 230° C. for 3 hours. A stable emulsion is formed having acrylic groups both in amide from and in choline salt form.

The above emulsions are employed is bonding fibrous substrates in repeat of the above examples.

Other suitable ethylene-acrylic interpolymer emulsions can be prepared by the above general procedure wherein a portion of the groups are in N-ethanolamide form, in diethanolaminoethyl ester form, in N-methylamide form, in potassium carboxylate form, and the like acrylic forms.

Other ethylene-alkyl acrylic ester copolymers can be employed in the process of Example 1 to provide bonding agents which are used in repeat of the above examples. For example, ethylene-methyl methacrylate, ethylene-ethyl acrylate, ethylene-butyl acrylate, and the like copolymers can be employed as the intermediate copolymers in the formation of the bonding agents.

What is claimed is:

1. A bonded fibrous substrate wherein fibers of said substrate are bonded one to another with a bonding agent comprising a water-insoluble, but self-emulsifiable ethylene polymer selected from the group consisting of:
   (1) polymers containing 67–99 mol percent of units (a) and, correspondingly, 33–1 mol percent of units (b),
   (2) polymers containing 67–99 mol percent of units (a) and, correspondingly, 33–1 mol percent of a mixture of units (b) and (d),
   (3) polymers containing 67–99 mol percent of units (a) and, correspondingly, 33–1 mol percent of a mixture of units (b) and (c),
   (4) polymers containing 67–99 mol percent of units (a) and, correspondingly, 33–1 mol percent of a mixture of units (b), (c) and (d), and
   (5) mixtures of (1), (2), (3) and (4):
      said units (a) having the structure

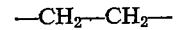

said units (b) having the structure

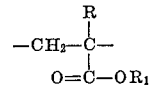

said units (c) having the structure

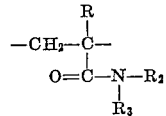

and said units (d) having the structure

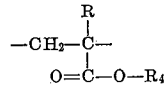

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the polymers self-emulsifiable, and wherein said self-emulsifiable ethylene polymer is prepared by the alkaline hydrolysis of an ethylene-alkyl acrylate polymer.

2. A bonded fibrous substrate wherein fibers of said substrate are bonded one to another with a bonding agent comprising a water-insoluble, but self-emulsifiable ethylene polymer selected from the group consisting of:
   (1) polymers containing 67–99 mol percent of units (a) and, correspondingly 33–1 mol percent of a mixture of units (b) and (c),
   (2) polymers containing 67–99 mol percent of units (a) and, correspondingly 33–1 mol percent of a mixture of units (b), (c) and (d), and
   (3) Mixtures of (1) and (2):
      said units (a) having the structure

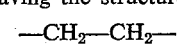

said units (b) having the structure

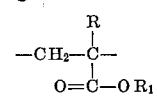

said units (c) having the structure

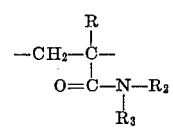

and said units (d) having the structure

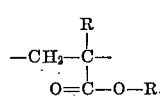

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the polymers self-emulsifiable.

3. A bonded fibrous substrate of claim 2 wherein the carboxylate groups as sodium carboxylate groups.

4. A bonded fibrous substrate of claim 2 wherein the carboxylate groups are potassium carboxylate groups.

5. A bonded fibrous substrate in accordance with claim 2 wherein the ethylene polymer bonding agent contains from about 0.025 to about 0.25 mol of units (b), (c) and (d) per mol of unit (a).

6. A bonded fibrous substrate in accordance with claim 2 wherein the ethylene-acrylic interpolymer bonding agent has from about 0.05 to 0.15 mol of units (b), (c) and (d) per mol of unit (a).

7. A bonded fibrous substrate of claim 2 wherein the units (b), (c) and (d) of said ethylene polymer bonding agent correspond to derivatives of the acid of the structure $CH_2=CH-CO-OH$.

8. A bonded fibrous substrate of claim 2 wherein the units (b), (c) and (d) of said ethylene polymer bonding agent correspond to derivatives of the acid of the structure $CH_2=C(CH_3)-CO-OH$.

9. The bonded fibrous substrate of claim 2 wherein said units (d) comprise from 0 to about 90 percent of the total of said units (b), (c) and (d) in said polymer, said units (c) comprise from about 1 to about 90 percent of said total of said units (b), (c) and (d) in said polymer, and said units (b) in carboxylate salt hydrophylic form comprise from about 10 to about 99 percent of said total of said units (b), (c) and (d) in said polymer, on a molar basis.

10. The bonded substrate of claim 2 wherein said units (d) comprise from 0 to about 90 percent of the total of said units (b), (c) and (d) in said polymer, said units (c) comprise from about 5 to about 70 percent of the said total of said units (b), (c) and (d) in said polymer, and wherein said units (b) present in carboxylate salt hydrophylic form and comprising from about 20 to about 80 percent of the said total of said units (b), (c) and (d) in said polymer, on a molar basis.

11. A process for preparing a bonded fibrous substrate comprising the steps of applying to said fibrous substrate a bonding agent comprising a water-insoluble, but self-emulsifiable ethylene polymer selected from the group consisting of:
(1) Polymers containing 67–99 mol percent of units (a) and, correspondingly, 33–1 mol percent of units (b),
(2) Polymers containing 67–99 mol percent of units (a) and, correspondingly, 33–1 mol percent of a mixture of units (b) and (d),
(3) Polymers containing 67–99 mol percent of units (a) and, correspondingly, 33–1 mol percent of a mixture of units (b) and (c),
(4) Polymers containing 67–99 mol percent of units (a) and, correspondingly, 33–1 mol percent of a mixture of units (b), (c) and (d), and
(5) Mixtures of (1), (2), (3) and (4):
said units (a) having the structure $$-CH_2-CH_2-$$

said units (b) having the structure

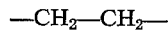

said units (c) having the structure

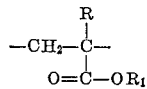

and said units (d) having the structure

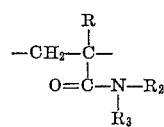

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the polymers self-emulsifiable, and wherein said self-emulsifiable ethylene polymer is prepared by the alkaline hydroysis of an ethyene-alkyl acrylate polymer, removing any excess bonding agent, and fusing said bonding agent by heating to form bonds between said fibers.

12. A process of bonding the fibers of a substrate one to another by applying to said fibrous substrate a bonding agent comprising a water-insoluble, but self-emulsifiable ethylene polymer selected from the group consisting of:
(1) Polymers containing 67–99 mol percent of units (a) and, correspondingly, 33–1 mol percent of a mixture of units (b) and (c),
(2) Polymers containing 67–99 mol percent of units (a) and, correspondingly, 33–1 mol percent of a mixture of units (b), (c) and (d), and
(3) Mixtures of (1) and (2):
said units (a) having the structure $$-CH_2-CH_2-$$

said units (b) having the structure

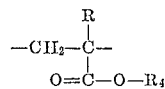

said units (c) having the structure

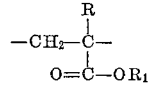

and said units (d) having the structure

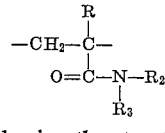

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the polymers self-emulsifiable, removing any excess bonding agent, and fusing said bonding agent as by heating to form bonds between the said fibers.

13. A dyed fibrous substrate wherein the pigment dye is bonded to the fibers thereof, said pigment dye bonded to said fibers by a bonding agent comprising a water-insoluble, but self-emulsifiable ethylene polymer selected from the group consisting of:
(1) Polymers containing 67–99 mol percent of units (a) and, correspondingly, 33–1 mol percent of units (b),
(2) Polymers containing 67–99 mol percent of units (a) and, correspondingly, 33–1 mol percent of a mixture of units (b) and (d),
(3) Polymers containing 67–99 mol percent of units (a) and, correspondingly, 33–1 mol percent of a mixture of units (b) and (c),
(4) Polymers containing 67–99 mol percent of units (a) and, correspondingly, 33–1 mol percent of a mixture of units (b), (c) and (d), and (5) Mixtures of (1), (2), (2) and (4):
said units (a) having the structure

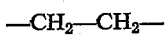

said units (b) having the structure

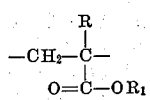

said units (c) having the structure

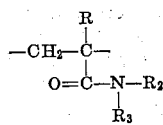

and said units (d) having the structure

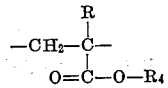

where R is selected from the group consisting of hydrogen and hydrocarbon groups, $R_1$ is selected from the group consisting of hydorgen and cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the polymers self-emulsifiable, and wherein said self-emulsifiable ethylene polymer is prepared by the alkaline hydrolysis of an ethylene-alkyl acrylate polymer.

14. A dyed fibrous substrate wherein the pigment dye is bonded to the fibers thereof, said pigment dye bonded to said fibers by a bonding agent comprising a water-insoluble, but self-emulsifiable ethylene polymer selected from the group consisting of:
 (1) Polymers containing 67–99 mol percent of units (a) and, correspondingly, 33–1 mol percent of units (b),
 (2) Polymers containing 67–99 mol percent of units (a) and, correspondingly, 33–1 mol percent of a mixture of units (b) and (d),
 (3) Polymers containing 67–99 mol percent of units (a) and, correspondingly, 33–1 mol percent of a mixture of units (b) and (c),
 (4) Polymers containing 67–99 mol percent of units (a) and, correspondingly, 33–1 mol percent of a mixture of units (b), (c) and (d), and
 (5) Mixtures of (1), (2), (3) and (4):
 said units (a) having the structure

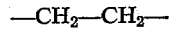

said units (b) having the structure

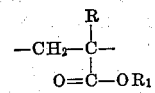

said units (c) having the structure

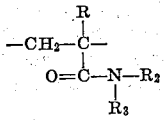

and said units (d) having the structure

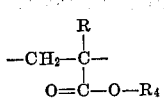

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (d) comprise from 0 to 90 percent of the total of said units (b), (c) and (d) in said polymer, said units (c) comprise from about 1 to about 90 percent of said total of said units (b), (c) and (d) in said polymer, and wherein said units (b) are in carboxylate hydrophylic form and comprise from about 10 to about 99 percent of said total of said units (b), (c) and (d) in said polymer, on a molar basis, and wherein said polymer is prepared by the alkaline hydrolysis of an ethylene-alkyl acrylate polymer.

15. Dyed fibrous substrate wherein the pigment dye is bonded to the fibers thereof, said pigment dye bonded to said fibers by a bonding agent comprising a water-insoluble, but self-emulsifiable ethylene polymer selected from the group consisting of:
 (1) Polymers containing 67–99 mol percent of units (a) and, correspondingly, 33–1 mol percent of units (b),
 (2) Polymers containing 67–99 mol percent of units (a) and, correspondingly, 33–1 mol percent of a mixture of units (b) and (d),
 (3) Polymers containing 67–99 mol percent of units (a) and, correspondingly, 33–1 mol percent of a mixture of units (b) and (c),
 (4) Polymers containing 67–99 mol percent of units (a) and, correspondingly, 33–1 mol percent of a mixture of units (b), (c) and (d), and
 (5) Mixtures of (1), (2), (3) and (4):
 said units (a) having the structure

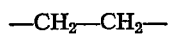

said units (b) having the structure

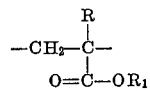

said units (c) having the structure

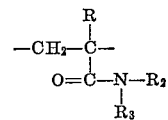

and said units (d) having the structure

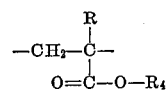

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, and said units (d) comprise from 0 to about 90 percent of the total of said units (b), (c) and (d) in said polymer, said units (c) comprise from about 5 to about 70 percent of said total of said units (b), (c) and (d) in said polymer, and wherein said units (b) in carboxylate salt hydrophylic form comprise from about 20 to about 80 percent of said total of said units (b), (c) and (d) in said polymer, on a molar basis.

16. A dyed fibrous substrate wherein the pigment dye is bonded to the fibers thereof, said pigment dye bonded to said fibers by a bonding agent comprising a water-insoluble, but self-emulsifiable ethylene polymer selected from the group consisting of:
 (1) Polymers containing 67–99 mol percent of units (a) and, correspondingly, 33–1 mol percent of a mixture of units (b) and (c),
 (2) Polymers containing 67–99 mol percent of units (a) and, correspondingly, 33–1 mol percent of a mixture of units (b), (c) and (d), and
 (3) Mixtures of (1) and (2);
 said units (a) having the structure

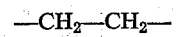

said units (b) having the structure

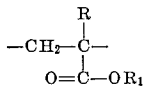

said units (c) having the structure

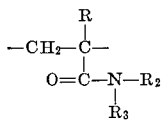

and said units (d) having the structure

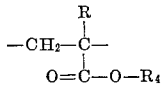

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the polymers self-emulsifiable.

17. A dyed fibrous substrate of claim 16 wherein the substrate has cotton fibers.

18. A dyed fibrous substrate of claim 16 wherein the substrate has polyamide fibers.

19. A dyed fibrous substrate of claim 16 wherein the substrate has rayon fibers.

20. A dyed fibrous substrate of claim 16 wherein the substrate has polypropylene fibers.

21. A dyed fibrous substrate wherein the pigment dye is bonded to the fibers thereof, said pigment dye bonded to said fibers by a bonding agent comprising a water-insoluble, but self-emulsifiable ethylene polymer selected from the group consisting of:
(1) Polymers containing 67–99 mol percent of units (a) and, correspondingly, 33–1 mol percent of a mixture of units (b) and (c),
(2) Polymers containing 67–99 mol percent of units (a) and, correspondingly, 33–1 mol percent of a mixture of units (b), (c) and (d), and
(3) Mixtures of (1) and (2):
said units (a) having the structure

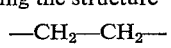

said units (b) having the structure

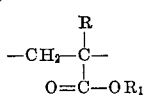

said units (c) having the structure

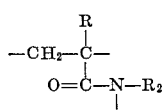

and said units (d) having the structure

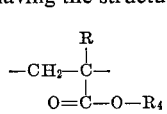

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (d) comprise from 0 to about 90 percent of the total of said units (b), (c) and (d) in said polymer, said units (c) comprise from about 1 to about 90 percent of said total of said units (b), (c) and (d) in said polymer, and wherein said units (b) in carboxylate salt hydrophylic form comprise from about 10 to about 99 percent of said total of said units (b), (c) and (d) in said polymer, on a molar basis.

22. A dyed fibrous substrate wherein the pigment dye is bonded to the fibers thereof, said pigment dye bonded to said fibers by a bonding agent comprising a water-insoluble, but self-emulsifiable ethylene polymer selected from the group consisting of:
(1) Polymers containing 67–99 mol percent of units (a) and, correspondingly, 33–1 mol percent of a mixture of units (b) and (c),
(2) Polymers containing 67–99 mol percent of units (a) and, correspondingly, 33–1 mol percent of a mixture of units (b), (c) and (d), and
(3) Mixtures of (1) and (2):
said units (a) having the structure

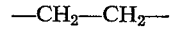

said units (b) having the structure

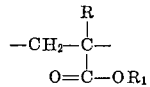

said units (c) having the structure

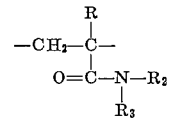

and said units (d) having the structure

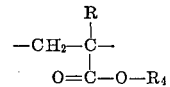

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, and said units (d) comprise from 0 to about 90 percent of the total of said units (b), (c) and (d) in said polymer, said units (c) comprise from about 5 to about 70 percent of said total of said units (b), (c) and (d) in said polymer, and wherein said units (b) in carboxylate salt hydrophylic form comprise from about 20 to about 80 percent of said total of said units (b), (c) and (d) in said polymer, on a molar basis.

23. A dyed fibrous substrate wherein the pigment dye is bonded to the fibers thereof, said pigment dye bonded to said fibers by a bonding agent comprising a water-insoluble, but self-emulsifiable ethylene polymer selected from the group consisting of:
(1) Polymers containing 67–99 mol percent of units (a) and, correspondingly, 33–1 mol percent of a mixture of units (b) and (c),
(2) Polymers containing 67–99 mol percent of units (a) and, correspondingly, 33–1 mol percent of a mixture of units (b), (c) and (d), and
(3) Mixtures of (1) and (2);
said units (a) having the structure

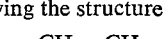

said units (b) having the structure

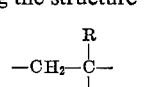

said units (c) having the structure

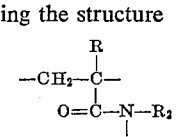

and said units (d) having the structure

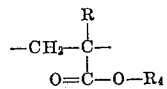

where R is selected from the group consisting of hydrogen and hydrocarbon groups, $R_1$ is selected from the group consisting of hydrogen and alkali metal cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the polymers self-emulsifiable.

24. A process of pigment dyeing a fibrous substrate comprising applying to said fibrous substrate a pigment dye and a bonding agent comprising a water-insoluble, but self-emulsifiable ethylene polymer selected from the group consisting of:
  (1) Polymers containing 67–99 mol percent of units (a) and, correspondingly, 33–1 mol percent of a mixture of units (b) and (c),
  (2) Polymers containing 67–99 mol percent of units (a) and, correspondingly 33–1 mol percent of a mixture of units (b), (c) and (d), and
  (3) Mixtures of (1) and (2),
    said units (a) having the structure

—CH$_2$—CH$_2$— said units (b) having the structure

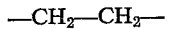

said units (c) having the structure

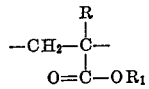

and said units (d) having the structure

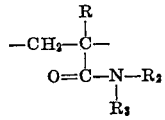

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the polymers self-emulsifiable, and fixing said pigment dye as by heating whereby the pigment dye is bonded to the fibers of said fibrous substrate by said bonding agent.

25. A process for preparing a dyed fibrous substrate comprising the steps of applying to said fibrous substrate a pigment dye and a bonding agent comprising a water-insoluble, but self-emulsifiable ethylene polymer selected from the group consisting of:
  (1) Polymers containing 67–99 mol percent of units (a) and, correspondingly, 33–1 mol percent of a mixture of units (b) and (c),
  (2) Polymers containing 67–99 mol percent of units (a) and, correspondingly 33–1 mol percent of a mixture of units (b), (c) and (d), and
  (3) Mixtures of (1) and (2):
    said units (a) having the structure

—CH$_2$—CH$_2$— said units (b) having the structure

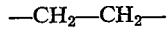

said units (c) having the structure

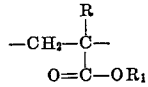

and said units (d) having the structure

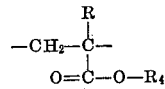

where R is selected from the group consisting of hydrogen and hydrocarbon groups, $R_1$ is selected from the group consisting of hydrogen and cations, $R_2$ and $R_3$ are independently selected from the group consisting of hydrogen, hydrocarbon groups and hydroxyalkyl groups, and $R_4$ is a hydrocarbon group, said units (b) and (c) being present in quantities sufficient to render the polymers self-emulsifiable, and fixing said pigment dye as by heating whereby the pigment dye is bonded to the fibers of said fibrous substrate by said bonding agent.

References Cited

UNITED STATES PATENTS

| | | | |
|---|---|---|---|
| 3,012,911 | 12/1961 | Moser. | |
| 3,074,834 | 1/1963 | Matlin et al. | 117—140 |
| 3,081,197 | 3/1963 | Adelman | 117—140 |
| 3,120,449 | 2/1964 | Griswold | 117—140 |
| 3,137,589 | 6/1964 | Reinhard et al. | 117—140 |
| 3,202,541 | 8/1965 | Hochberg | 117—140 |
| 2,953,551 | 9/1960 | White | 260—86.7 |

FOREIGN PATENTS

| | | |
|---|---|---|
| 678,279 | 9/1952 | Great Britain. |
| 959,815 | 5/1964 | Great Britain. |
| 836,988 | 10/1938 | France. |

ALFRED L. LEAVITT, Primary Examiner

U.S. Cl. X.R.

117—126, 143, 145, 161; 260—29.6, 874